ated Oct. 6, 1914.

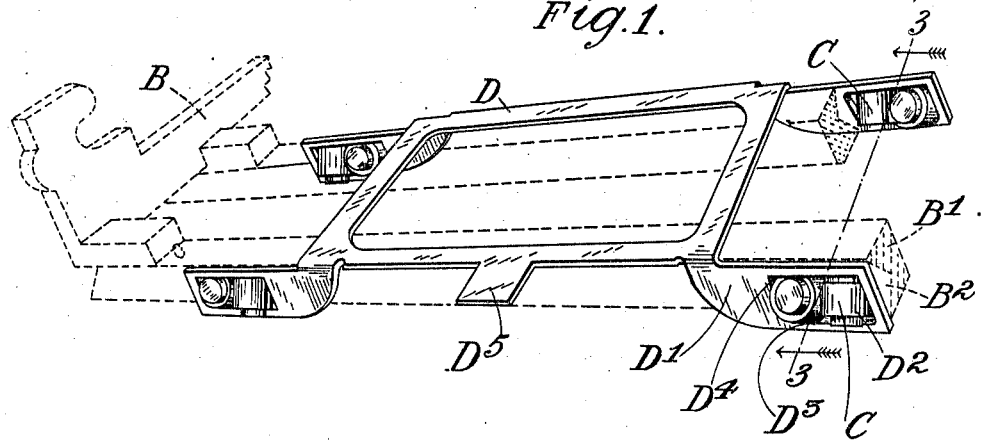
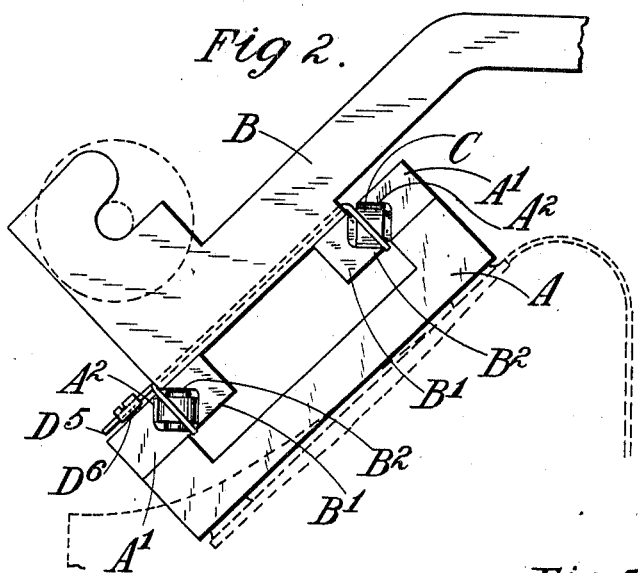
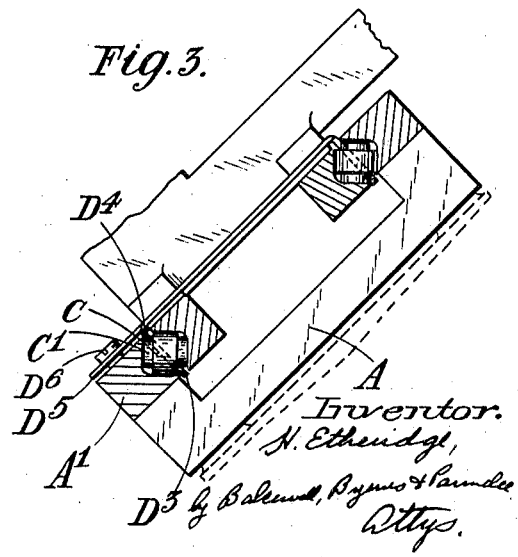

UNITED STATES PATENT OFFICE.

HERBERT ETHERIDGE, OF WIMBLEDON PARK, ENGLAND, ASSIGNOR TO THE BAR-LOCK TYPEWRITER COMPANY LIMITED, OF LONDON, ENGLAND.

ROLLER-BEARING AND SEPARATOR FOR THE ROLLERS.

1,112,900.      Specification of Letters Patent.      Patented Oct. 6, 1914.

Application filed May 23, 1914. Serial No. 840,472.

*To all whom it may concern:*

Be it known that I, HERBERT ETHERIDGE, a subject of the King of England, residing at Wimbledon Park, in the county of Surrey, England, have invented certain new and useful Improvements in Roller-Bearings and Separators for the Rollers, of which the following is a specification.

This invention is for improvements in or relating to roller bearings and separators for the rollers and has special reference to the bearings for the platen-carriage of a typewriter.

The invention will be described as applied to a typewriter, but it will be understood that it is applicable to roller bearings for other purposes.

In a typewriter, two runners or rails are mounted on the frame of the machine and two other runners or rails coöperating therewith are mounted on the platen-carriage. Each pair of coöperating rails lie side by side, and the adjacent faces are grooved so as to provide a channel between the rails of approximately square section. Rollers are arranged in this channel to enable one rail to travel longitudinally with respect to the other so that the platen-carriage is easily movable.

The present invention comprises the combination with rollers for a roller bearing, each roller having its ends reduced so that a shoulder is provided between such reduced end and the main body of the roller, of a separator comprising a plate having in it slots to receive the rollers, two opposed edges of each slot being so spaced apart that they can engage each roller at each end on opposite sides of its axis in the angles of the shoulders. Each slot in the separator may be closed and made of sufficient length to receive two rollers, these being placed therein with their axes at right angles to each other in parallel planes which are at right angles to the direction of travel of the separator. The separator may have an approximately centrally situated tongue thereon to engage stops fixed at each end of its path to restrict the travel of the separator for the purpose hereinafter described.

In the accompanying drawings—Figure 1 is a perspective view showing the roller bearings and separator for a platen-carriage; Fig. 2 is an end elevation, and Fig. 3 is a transverse section on the line 3—3 of Fig. 1.

Like letters indicate like parts throughout the drawings.

The frame A of the machine has mounted on it two rails $A^1$ which are grooved longitudinally as at $A^2$ to provide a race for the roller bearings. On the platen-carriage B are two rail $B^1$ grooved at $B^2$ similarly to the rails $A^1$ so that when each pair of rails $A^1$, $B^1$ are in their operative position side by side a channel of square section is provided to receive the rollers C which are of such diameter that they roll on opposite faces of the channel $A^2$ $B^2$. Each roller has its ends reduced as at $C^1$ so that a shoulder is provided between the ends $C^1$ and the main body C.

The separator D is arranged to serve the rollers in both pairs of rails and is provided with lugs $D^1$ which extend into the gap between each pair of rails $A^1$, $B^1$. Each lug is slotted at $D^2$ to receive the roller C which are set diagonally in it. The opposed inner edges $D^3$, $D^4$ of each slot $D^2$ enter the angles formed on the rollers between the parts C, $C^1$ as shown most clearly in Fig. 3. Each slot $D^2$ is of such dimensions that the rollers C are sprung into it and thereafter retained in place, so that the separator can be disengaged longitudinally from the runners $A^1$ $B^1$ carrying the rollers with it. Each slot $D^2$ in the separator is made of sufficient length to accommodate two rollers, and these are set with their axes in parallel planes but at right angles to one another, the planes being at right angles to the direction of travel of the separator, *i. e.* to the rails $A^1$ $B^1$. It will be seen that with this arrangement each pair of rollers engages all four faces of the channel $A^2$, $B^2$, one roller engaging one pair of opposite faces and the other roller the other pair. The two rails are therefore maintained always in their correct relative position. The separator D has a tongue $D^5$ about the middle of its length extending over one of the rails $A^1$ fixed on the frame of the machine. There are also provided on this rail two stops $D^6$ which are arranged to extend into the path of the tongue $D^5$ and limit its movement. The stops $D^6$ are arranged approximately equi-distant from the mid point of travel of the tongue $D^5$ and serve to maintain the separator, and therefore the rollers, correctly spaced longitudinally on the rails $A^1$ and $B^1$. It will be appreciated that the separator D travels only half the distance traveled by the rails $B^1$ relatively to the rails $A^1$, provided there is no slipping or sticking of the rollers. If, however, the separator owing to slip of the rollers, moves, say with the rails $B^1$, it would be carried too far along the rails $A^1$, and the platen carriage B would not be properly supported. The tongue $D^5$ prevents such extra movement by engaging with one of the stops $D^6$, so that the separator and rollers are automatically constrained to be in their correct position each time the platen-carriage reaches the end of its travel.

While a particular construction of roller bearing has been described, it will be appreciated that modifications may be made in the mechanical construction without departing from the spirit of the invention as set forth in the appended claims, thus for example, the invention may be applied to a circular bearing for reciprocating or continuous motion.

What I claim as my invention and desire to secure by Letters Patent is:—

1. In a roller-bearing the combination of, a plurality of rollers each having its end reduced to provide a shoulder, and a slotted plate whereof its opposite edges engage the ends of each roller on opposite sides of its axis, substantially as set forth.

2. In a roller-bearing the combination of, a plurality of rollers each having its end reduced to provide a shoulder, and a slotted plate whereof its opposite edges engage the ends of each roller on opposite sides of its axis close to the shoulder and close to the circumferential face of the reduced end, substantially as set forth.

3. In a roller-bearing the combination of, two rollers each having its ends reduced to provide a shoulder, and a slotted plate whereof its opposite edges engage the ends of each roller on opposite sides of its axis, said rollers being disposed in the slot with their axes at right angles to each other in parallel planes which are at right angles to the direction of travel of the plate, substantially as set forth.

4. In a roller-bearing the combination of, a plurality of rollers each having its end reduced to provide a shoulder, a race wherein said rollers move, stops on said race, a slotted plate whereof its opposite edges engage the ends of each roller on opposite sides of its axis, said plate also having an approximately centrally situated tongue to engage said stops, substantially as set forth.

In testimony whereof I have signed my name to this specification in the presence of two subscribing witnesses.

HERBERT ETHERIDGE.

Witnesses:
HARRY B. BRIDGE,
A. J. COWING.